United States Patent [19]

Rogers

[11] Patent Number: 5,471,871
[45] Date of Patent: Dec. 5, 1995

[54] AUTOMATIC TRANSMISSION TESTER

[76] Inventor: Ieric L. Rogers, 1417 Hollywood, Abilene, Tex.

[21] Appl. No.: 264,020

[22] Filed: Jun. 22, 1994

[51] Int. Cl.[6] .................................................. G01M 19/00
[52] U.S. Cl. ........................................ 73/118.1; 73/116
[58] Field of Search .................................. 73/118.1, 116

[56] References Cited

U.S. PATENT DOCUMENTS

| | | |
|---|---|---|
| 3,967,495 | 7/1976 | Wesner et al. . |
| 4,274,278 | 6/1981 | Patterson . |
| 4,356,724 | 11/1982 | Ayoub et al. . |
| 4,391,131 | 7/1983 | Scourtes . |
| 4,468,958 | 9/1984 | Takeshita . |
| 4,520,659 | 6/1985 | Lucia et al. . |
| 4,732,036 | 3/1988 | Weeder ................................ 73/118.1 |
| 4,809,544 | 3/1989 | Magoolaghan ..................... 73/118.1 |
| 4,823,596 | 4/1989 | Meyers et al. . |
| 4,920,788 | 5/1989 | Ando et al. ........................... 73/118.1 |
| 4,998,437 | 3/1991 | Magoolaghan . |
| 5,060,177 | 10/1991 | Gregory et al. . |
| 5,060,178 | 10/1991 | Kato et al. . |
| 5,097,699 | 3/1992 | Sano et al. . |

*Primary Examiner*—Richard Chilcot
*Assistant Examiner*—Max H. Noori
*Attorney, Agent, or Firm*—Novak Druce Herrmann Burt

[57] ABSTRACT

A machine for utilization in the testing of automobile automatic transmissions consisting of a mobile frame, a plate for placement of the transmission, a mantel assembly for connection to the transmission, a head assembly having a flywheel and pulley, the mantel assembly capable of vatical and longitudinal movement, the head assembly capable of transversal and longitudinal movement, and the plate capable of vertical and longitudinal movement. The mantel assembly having a single index plate capable of mating with most front wheel drive transmissions as well as a index plate for mating with most rear wheel drive transmissions.

2 Claims, 2 Drawing Sheets

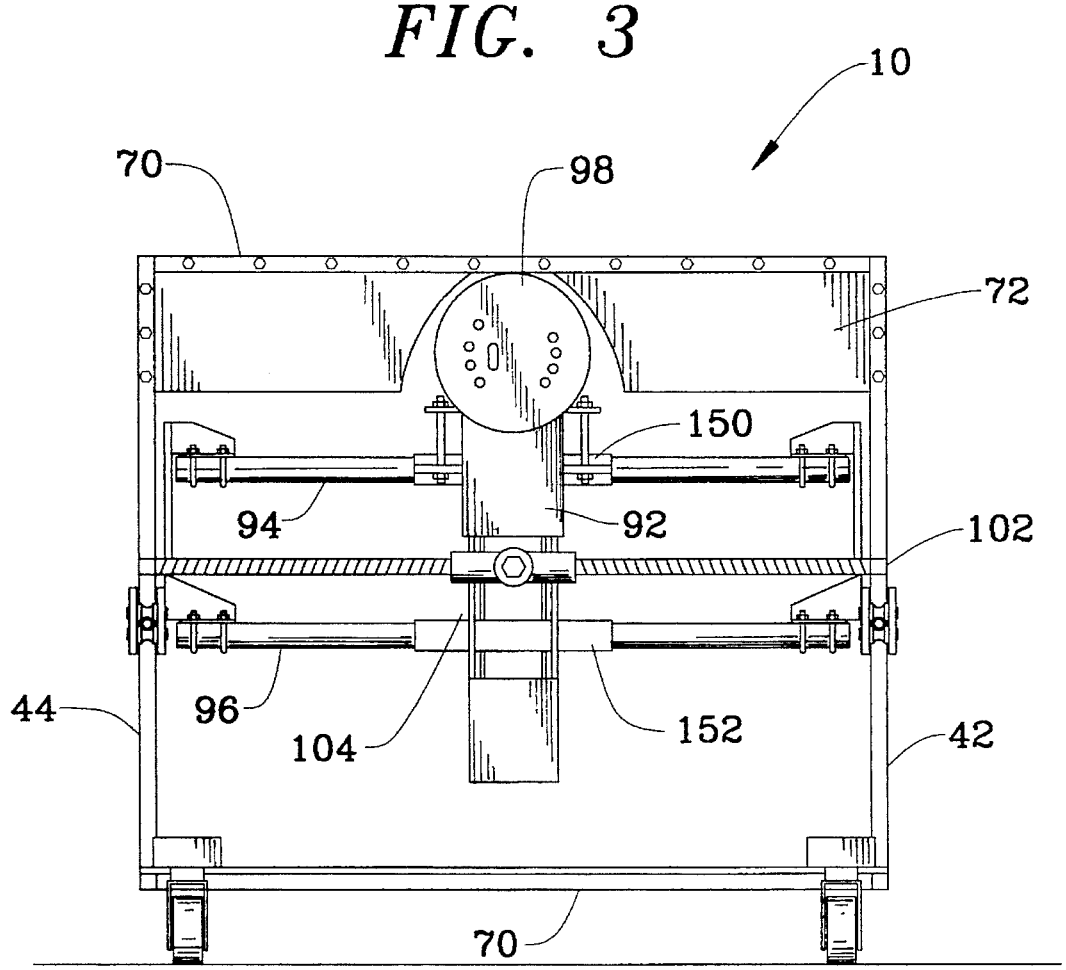

AUTOMATIC TRANSMISSION TESTER

BACKGROUND ART

1) Field of the Invention

The present invention relates to transmission testers, and more particularly to an automatic transmission tester apparatus utilized for testing automobile automatic transmissions in a shop environment.

2) Description of the Related Art

Automobile repair shop owners have been frustrated by the absence of a transmission testing machine which could easily adopt to different current transmissions, and future transmissions. The absence of such a machine renders the purchase of a testing machine unable to adopt to future transmissions, economically impractical for a small repair shop owner. In testing machines incapable of adopting to future transmissions, the time period to recover one's investment is shortened due to the progressive nature of the automobile industry which develops new automobile transmissions on a regular basis.

Sano et al, U.S. Pat. No. 5,097,699 discloses a method and system for testing an automotive power transmission comprising measuring an engine operating parameter, measuring a first, second and third revolutional speed on a power transmission input/output shaft, and measuring a first, second and third drive torque of the low inertia driving unit having the same characteristics as the engine corresponding to the power transmission being tested through the method and system of the invention.

Weeder, U.S. Pat. No. 4,732,036, discloses an automatic transmission test apparatus comprising a main frame having a headstock frame which supports an automotive engine and automatic transmission, the engine and transmission supported as to allow for vertical and transversal adjustment for alignment which provides for testing of right-hand drive, left-hand drive and center drive type transmissions.

Lucia et al, U.S. Pat. No. 4,520,659, discloses a transmission testing apparatus comprising a test stand permitting alignment of a transmission's input and output shafts with a prime mover output shaft and energy absorbing shafts allowing for testing of straight through transmissions and transaxle transmissions.

SUMMARY OF THE INVENTION

The present invention is a portable apparatus for testing the automatic transmission of an automobile. The present invention has a unique index plate which is capable of mating to most right-handed front wheel drive transmissions, and then reversed to mate with most left-handed front wheel drive transmissions. The index is also capable of mating with most rear wheel drive transmissions. The ability to use only two plates to test most transmissions allows a repair shop owner the ability to recoup his investment in a testing apparatus.

It is an object of the present invention to provide an improved automatic transmission testing apparatus.

It is a further object of the present invention to provide an automatic transmission testing apparatus capable of testing most front and rear wheel drive transmissions.

It is a further object of the present invention to provide an automatic transmission testing apparatus having an index plate capable of mating with most front wheel drive transmissions.

It is a further object of the present invention to provide an automatic transmission testing apparatus having an index plate capable of mating with most rear wheel drive transmissions.

It is a further object of the present invention to provide an automatic transmission testing apparatus capable of three dimensional movement while a transmission is attached thereto.

It is a further object of the present invention to provide an automatic transmission testing apparatus which facilitates testing of a transmission.

BRIEF DESCRIPTION OF THE DRAWINGS

The present invention is further described in connection with the accompanying drawings, in which:

FIG. 3 is a drawing illustrating a front perspective of the present invention.

DETAILED DESCRIPTION OF THE INVENTION

Figure 1:
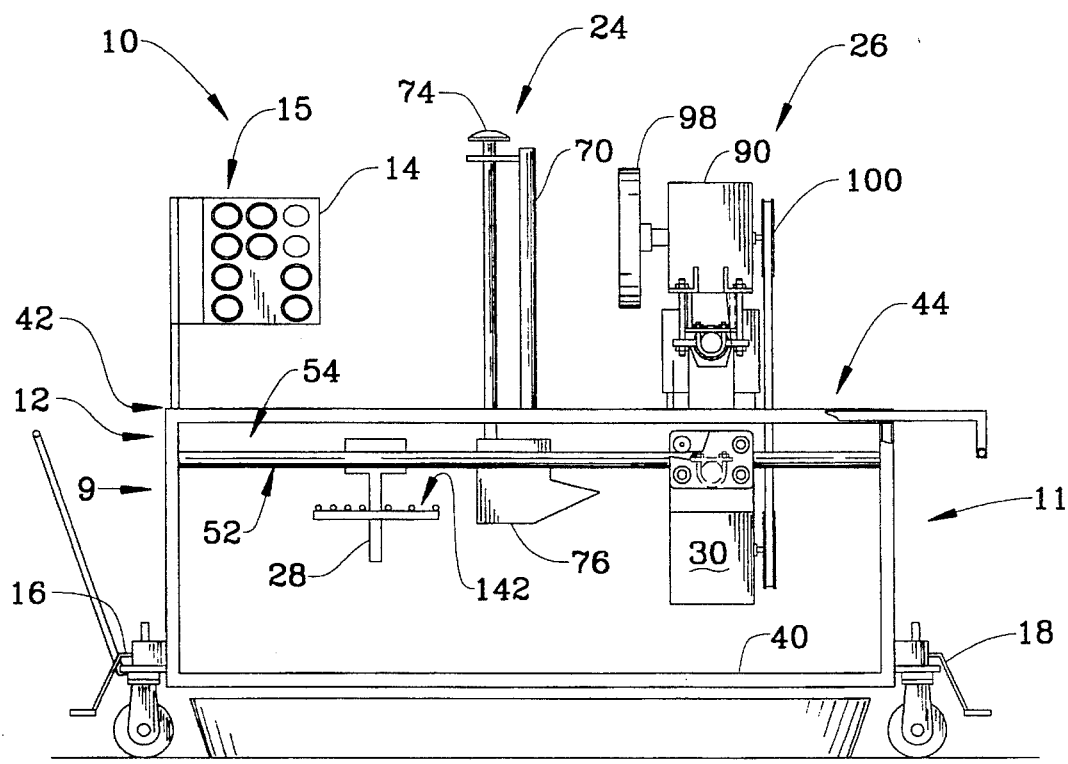
FIG. 1 is a drawing illustrating a side perspective of the present invention.
Figure 2:
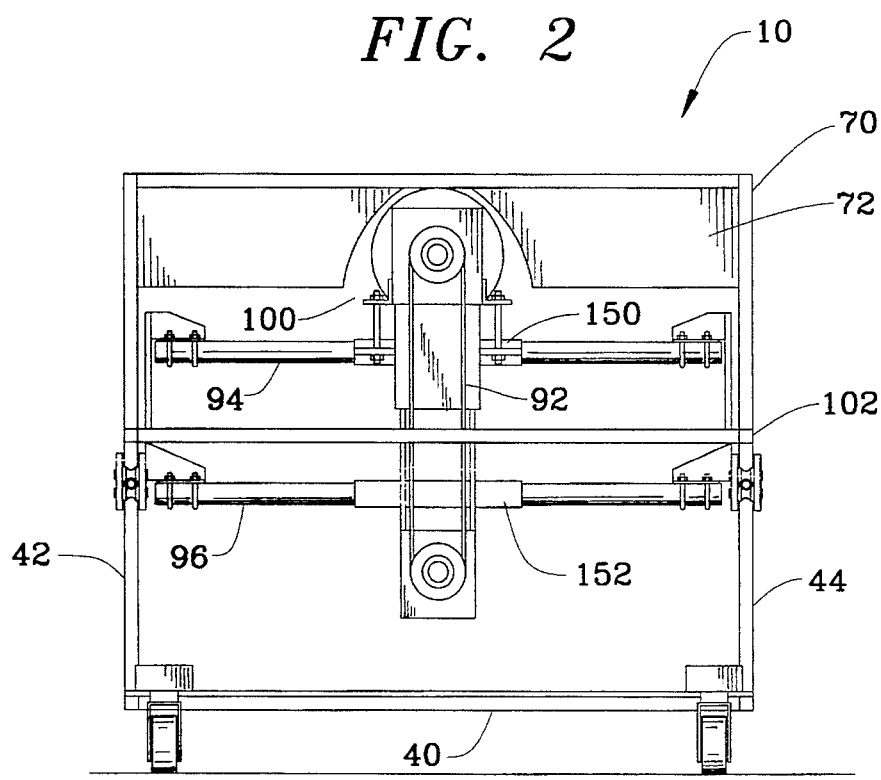
FIG. 2 is a drawing illustrating a rear perspective of the present invention.

Referring to FIGS. 1, 2 and 3, the testing apparatus 10 essentially comprised of a support frame 12 having, a instrument panel 14, a forward wheel unit 16, a rearward wheel unit 18, a transmission fluid recovery unit, a control mantel assembly 24, control head assembly 26, a jack lift assembly 28, and power module or rotational source 30.

Support frame 12 has a forward end 9 and a rearward end 11, a rectangular base 40, a pair of rectangular sides 42 and 44, perpendicular to base 40 and parallel to each other, a lower forward cross bar 46 connected between the pair of rectangular sides 42 and 44 at the forward end of frame 12, a lower rearward cross bar and a upper rearward cross bar, both rearward cross bars and connected between the pair of rectangular sides 42 and 44 at the rearward end of frame 12, and a pair of elongated longitudinal rods 52 and 54, parallel to each other and extending the length of support frame 12. In the preferred embodiment, support frame 12 is composed of steel square tubing and welded together to form a solid self supporting frame for the other components of the present invention.

Instrument panel 14 is attached to the forward end of support frame 12. Instrument panel 14 is attached in a manner to allow rotational movement of the instrument panel 14 along a vertical axis perpendicular to rectangular base 40. The instrument panel 14 is used as a diagnostic tool to assist the user of apparatus 10 in discovering defects or problems in an automobile transmission. The instrumentation of panel 14 is directly connected to a transmission to diagnose defects or problems with the transmission, and/or to determine if the transmission has been repaired correctly. The instrumentation of panel 14 may be directly connected to a transmission while the transmission is installed in an automobile to diagnose a transmission. On the face of instrumentation panel 14 is a plurality of gauges 15 including a cooler gauge, a governor gauge, a line gauge, a second gauge, a third gauge, an overdrive gauge, a five speed gauge, a six speed gauge, a RPM gauge, a temperature gauge, a MPH gauge, and a voltmeter.

Power module 30, offers different power sources for powering apparatus 10. Power module 30 is bolted to support frame 12 through a fuesialodge frame of power module 30. Power module 30 allows for use of electric power, gas power or hydraulic power, of differing horsepowers and RPMs, to supply power to apparatus 10. However, other embodiments would have the power module attached to rectangular base 40 of apparatus 10. Such an embodiment has an electric motor resting on rearward wheel unit 18.

Control mantel assembly 24 consists of a mantel frame 70, a mantel index plate 72, a mantel adjuster screw 74, mantel adjustment base 76, and a pair of mantel elongated vertical rods. Mantel frame 70 has a cross bar connected to a pair of elongated vertical bars which sit on mantel adjustment base 76. Mantel index plate 72 is bolted to mantel frame 70, a plurality of bolts coupled to a plurality of holes on the forward face of mantel frame 70. The bell housing of the transmission to be tested is connected to mantel index plate 72, mantel index plate 72 already bolted to mantel frame 70. Mantel index plate 72 will have three variations, one for right-handed front wheel drive transmissions, one for left-handed front wheel drive transmissions, and one for rear wheel drive transmissions. In the preferred embodiment, only one mantel index plate 72 is necessary for both front wheel drive configurations, index plate 72 only needing to be reversed to move from testing a right-handed front wheel drive to a left-handed front wheel drive. This novel ability of only needing two index plates to test most transmissions, and most future transmissions, allows the present invention to be universally applied to the testing of most transmissions. Mantel adjuster screw 74 allows the mantel assembly 24 to adjust in a vertical axis, through turning adjuster screw 74 to raise or lower the height of mantel assembly 24. In this way, the transmission attached to mantel index plate 72 can be vertically adjusted to correspond to the components of control head assembly 26 for testing of the transmission. Mantel adjustment base 76 allows for movement of the mantel assembly 24 on a longitudinal axis. Mantel adjustment base 76 is engaged to elongated rods 52 and 54 allowing for sliding of mantel assembly 24 towards the forward end 9 or rearward end 11 of apparatus 10. The pair of elongated vertical rods are attached to and perpendicular to mantel adjustment base 76. Screw adjuster 74 is placed through rod with a similar screw through rod. The rods support mantel frame 70, and act to control the vertical movement of mantel frame 70.

Control head assembly 26 consists of a head frame 90, a center member 92, an upper horizontal rod 94, a lower horizontal rod 96, a flywheel 98, a pulley unit 100, a transversal screw adjuster 102, and a longitudinal screw adjuster 104. The head frame 90 is engaged to upper horizontal rod 94 and lower horizontal rod 96 which are themselves engaged to the pair of elongated rods 52 and 54 through a plurality of bushings, allowing for longitudinal movement of control head assembly 26. Thus, control head assembly 26 can move forward or rearward along support frame 12 allowing for a facilitated installation of the transmission to be tested by apparatus 10. Center member 92 is engaged with upper horizontal rod 94 and lower horizontal rod 96 through a plurality of engagement holes, center member 92 perpendicular to rods 94 and 96. Linear bushings 150 and 152 interposed between rods 94 and 96 and center member 92 allow for transversal movement of center member 92 along rods 94 and 96. The transversal movement of center member 92 allows for a facilitated installation of the transmission to be tested by apparatus 10. A transversal screw adjuster 102 engaged through a coupling on center member 92, controls the transversal movement of center member 92. Through turning screw adjuster 102, center member 92 is moves from side to side, allowing for an user of apparatus 10 to easily position center member 92. Longitudinal screw adjuster 104 is positioned through center member 92 and controls the longitudinal movement of control head assembly 26. Through turning screw adjuster 104, control head assembly 26 is moved forward or rearward along support frame 12, allowing for an user of apparatus 10 to easily position control head assembly 26. Pulley unit 100 consists of a variable speed pulley, a pulley chain, a drive shaft, a flywheel shaft and a flywheel 98. A drive line of power module 30 is connected to drive shaft. Drive line rotates drive shaft 105 which rotates pulley which in turn rotates flywheel shaft and flywheel 98 which is connected to shaft. Flywheel 98 is connected to the bell housing of the transmission to be tested. Through activation of drive line, the transmission to be tested is activated while installed on apparatus 10.

Forward wheel unit 16 consists of a pair of tires engaged with a T bar which is connected below and perpendicular to lower forward cross bar 46, the T bar connected in such a way as to allow for rotational movement along the perpendicular axis. Attached to T bar is a lever with a pair of handles and located opposite of the lever connection to T bar. Rearward wheel unit 18 consists of a shaft extending across rectangular base 40 at the near rearward end of support frame 12, with a pair of tires and engaged with shaft. Rearward wheel unit 18 and forward wheel unit 16 allow for, and control, the mobility and steering of apparatus 10.

Jack lift assembly 28 consists of a jack frame, a roller plate 142, a hydraulic jack, and a pair of vertical plate rods. Jack frame is engaged to elongated rods 52 and 54 through a plurality of linear bushings 150 and 152 which allow for longitudinal movement of jack assembly 28. Roller plate 142 is supported by plate rods which also allow for vertical movement of roller plate 142. Hydraulic jack is positioned on a cross bar of jack frame, beneath roller plate 142. Roller plate 142 is raised or lowered through operation of hydraulic jack. Roller plate 142 has a plurality of metal rollers which allow for conveyance of an object place on roller plate 142. Jack lift assembly is positioned forward of control mantel assembly 24 which is positioned forward of control head assembly 26.

A transmission fluid recovery unit is an optional component of apparatus 10. Transmission fluid recover unit 22 consists of a fluid tank for holding transmission fluid, a fluid pump for pumping fluid from the tank to the transmission, a fluid volume meter for measuring the amount of fluid flowing to the transmission, a fluid hose in flow communication between the meter and the transmission, a reservoir fluid tray for receiving fluid from the transmission and directing the fluid to tank, and a fluid filter for filtering from the fluid tank.

In operation, a transmission which has been removed from an automobile, or which has just been repaired is tested for such things as governor pressure, line pressure, internal leaks, vibrations, outbound torque, RPM shift, noise, and other potential problems by utilization of apparatus 10. The transmission is placed on roller plate 142 of jack lift assembly 28 which is then moved toward control mantel assembly 24. The use of hydraulic jack, roller plate 142 is raised to a level in which the bell housing of the transmission can be attached to mantel index plate 72. Then, mantel assembly 24 with the transmission attached, is positioned transversely and vertically to correspond to control head assembly 26. Control head assembly 26 is also adjusted so as to have a center line match between the control head assembly 26 and the transmission. When a technician can turn the flywheel by hand, the centerline is matched. Starting with blank plates, the technician would use hold location punch tool sets to locate the exact bolt hole locations, and dal pin holes in the bell housing using the punch set. The plate is removed by removing five bolts, a drill press is used according to the bolt size and the plate is installed with converter bolts and spacers an install bell housing plates to the plate and tighten. Next, various gauges are connected to the transmission to test for various defects.

While preferred embodiments of the invention have been shown and described, it will be apparent to those skilled in this art that various modification may be made in the embodiments without departing from the spirit of the present invention.

Therefore, the embodiments of the invention in which an exclusive property or privilege is claimed are defined as follows:

1. An automatic transmission tester, said automatic transmission tester comprising:

a support frame having a rectangularly shaped base, a forward end, a rearward end, two opposing positioned rectangular sides, and a pair of elongated rods connected to said support frame and extending along the length of said support frame;

said support frame connected upon a forward wheel unit and a rearward wheel unit thereby allowing mobility of said automatic transmission tester from one location to another;

an instrument panel mounted upon said support frame and capable of rotational movement relative thereto, said instrument panel having a plurality of gauges that monitor conditions of the automatic transmission being tested;

a control head assembly mounted upon said pair of elongated rods for relative longitudinal movement along the length of said support frame;

said control head assembly having a flywheel connectable into driving engagement with the automatic transmission to be tested;

a control mantel assembly mounted upon said pair of elongated rods for relative longitudinal movement along the length of said support frame, said control mantel assembly being transversely movable along horizontal rods at linear bushings, said control mantel assembly having a mantel adjuster screw for vertical adjustment of said control mantel assembly relative to said support frame thereby allowing proper orientation of said control mantel assembly to said control head assembly for engagement of said flywheel to the automatic transmission connected to said control mantel assembly for testing;

said control mantel assembly having a mantel index plate connectable to the bell housing of the automatic transmission to be tested;

said mantel index plate being reversibly connectable to a mantel frame of said control mantel assembly thereby accommodating connection of right-handed and left-handed front wheel drive automatic transmissions;

a jack lift assembly located adjacent to said control mantel assembly, said jack lift assembly having a roller plate upon which the automatic transmission to be tested may be placed; and said jack lift assembly vertically movable into a position proximate to said mantel index plate when said control mantel assembly is in a lowered position thereby accommodating connection of the bell housing of the automatic transmission being carried upon said jack lift assembly to said mantel index plate.

2. The automatic transmission tester as recited in claim 1, said control head assembly further comprising:

a pulley unit for driving said flywheel; and said pulley system being mounted to a center member of said control head assembly, and said pulley system being driven by a rotational source.

* * * * *